United States Patent
Liu

(10) Patent No.: US 8,322,330 B2
(45) Date of Patent: Dec. 4, 2012

(54) HEATING DEVICE OF DRINKING FOUNTAIN IN CAR

(76) Inventor: Shin-I Liu, Hualien County (TW)

( * ) Notice: Subject to any disclaimer, the term of this patent is extended or adjusted under 35 U.S.C. 154(b) by 769 days.

(21) Appl. No.: 12/484,421

(22) Filed: Jun. 15, 2009

(65) Prior Publication Data

US 2010/0313826 A1   Dec. 16, 2010

(51) Int. Cl.
*F24B 1/00* (2006.01)
(52) U.S. Cl. ............ 126/19.5; 122/3
(58) Field of Classification Search .......... 126/19.5; 122/18.31
See application file for complete search history.

(56) References Cited

U.S. PATENT DOCUMENTS

| | | | | |
|---|---|---|---|---|
| 2,473,103 A | * | 6/1949 | Lathers | 181/269 |
| 2,482,878 A | * | 9/1949 | Schmidt | 432/234 |
| 2,894,265 A | * | 7/1959 | Reardon | 4/615 |
| 3,148,675 A | * | 9/1964 | Menuto | 126/19.5 |
| 3,793,992 A | * | 2/1974 | Marquez | 122/20 B |
| 4,101,280 A | * | 7/1978 | Frietzsche et al. | 422/180 |
| 4,424,028 A | * | 1/1984 | Magera | 432/234 |
| 4,694,891 A | * | 9/1987 | Okumura et al. | 165/41 |
| 4,771,822 A | * | 9/1988 | Barbosa | 165/41 |
| 5,131,351 A | * | 7/1992 | Farina | 122/250 R |
| 2004/0197242 A1 | * | 10/2004 | Holden et al. | 422/179 |
| 2005/0235979 A1 | * | 10/2005 | Whittaker | 126/19.5 |
| 2007/0158048 A1 | * | 7/2007 | Ferraro | 165/47 |

* cited by examiner

*Primary Examiner* — Steven B McAllister
*Assistant Examiner* — John Bargero
(74) *Attorney, Agent, or Firm* — Rabin & Berdo, P.C.

(57) ABSTRACT

The present invention provides a heating device of a drinking fountain in a car. It has a helical pipe, a wire net, an iron container, fireproof mud and a car exhaust pipe. The helical pipe is installed outside the car exhaust pipe and the wire net is used to cover the pipes. The iron container covers the wire net, the helical pipe and the car exhaust pipe. Fireproof mud is poured into the reserved space in the iron container and it is sealed completely. One end of the helical pipe is a water outlet, while the other end is a water intake. The car exhaust pipe generates high temperature and heats the helical pipe which is insulated by fireproof mud. When users push the drinking fountain switch, a motor will operate to pump out water from water storage. The water is heated when it goes by the helical pipe.

1 Claim, 1 Drawing Sheet

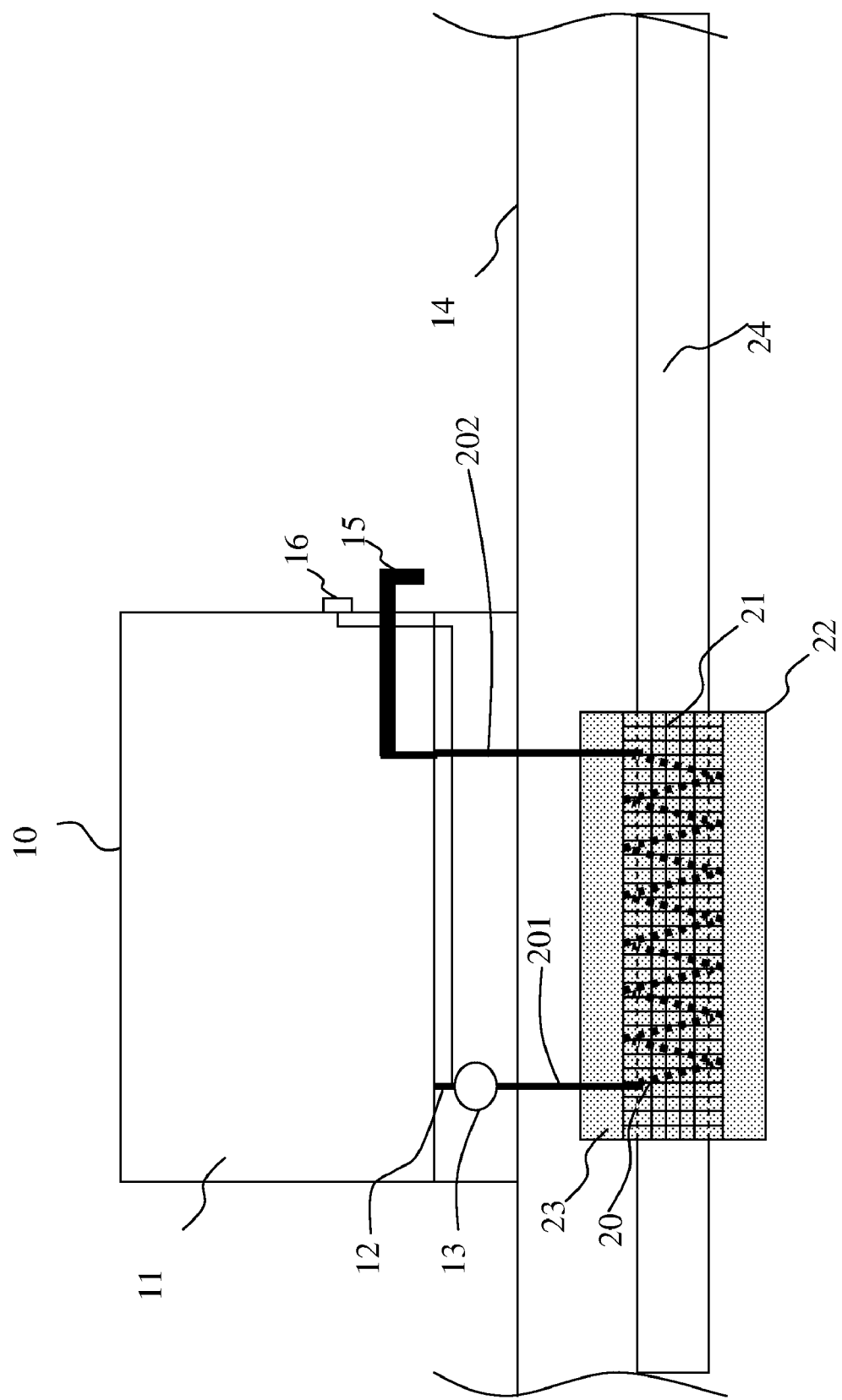

HEATING DEVICE OF DRINKING FOUNTAIN IN CAR

FIELD OF THE INVENTION

The present invention provides a heating device of a drinking fountain in a car. It needs no external power to heat water in the drinking fountain. Heat generated by the exhaust pipe when the car starts is used only and conducted to the helical pipe. Besides, with the keeping warm effect of the fireproof mud, the helical pipe is maintained at a certain high temperature. When water in the drinking fountain goes by the helical pipe, it is heated for use.

BACKGROUND OF THE INVENTION

There is no device for providing hot water in a car so that a cup of hot tea or drink must be bought in a store when it is temporarily needed during driving. Alternatively, the hot tea or drink should be prepared before the drive. Moreover, it is also a very common inconvenience when preparing formula for babies because there is no hot water available in the car. Therefore, there may be a trend to install drinking fountains in cars. Such equipment has to use the power system of the car for providing hot water to users. However, it burdens the system with heavy power consumption. Due to the problems mentioned above, the inventor innovates and creates the present invention based on his seasoned experience in manufacturing and design in related fields.

SUMMARY OF THE INVENTION

The main point of the present invention is composed of a helical pipe, a wire net, an iron container, a fireproof mud and a car exhaust pipe. When the car starts, the high temperature generated by an exhaust pipe is utilized to conduct heat to the helical pipe. With the insulation effect of the fireproof mud, the helical pipe is maintained at a high temperature. When the water in the drinking fountain goes by the helical pipe, it is heated for use.

BRIEF DESCRIPTION OF THE DRAWING

FIG. 1 is the designated drawing of the present invention.

DETAILED DESCRIPTION OF THE PREFERRED EMBODIMENTS

Please refer to FIG. 1. A drinking fountain (10) is installed in the car cabin. The drinking fountain (10) has a water storage (11) inside. The water storage (11) has a joint pipe (12) and is connected to a pump (13).

The present invention comprises a helical pipe (20), a wire net (21), an iron container (22), a fireproof mud (23) and a car exhaust pipe (24).

The helical pipe (20) is made of a pipe coiled helically and mounted outside the car exhaust pipe (24). One end of the helical pipe (20) is a water intake (201) which extends across an automobile chassis (14) and is connected to the motor (13). The other end of the helical pipe (20) is a water outlet (202) which extends the automobile chassis (14) and is connected to a water tap (15) of the drinking fountain (10).

The wire net (21) covers the helical pipe (20) and the car exhaust pipe (24) so that the wire net (21) can prevent the fireproof mud (23) from loosening. Next, the iron container (22) covers the helical pipe (20), the car exhaust pipe (24) and the wire net (21). A space is reserved in the iron container (22). Then, the fireproof mud (23) is poured into the iron container (22) so that the helical pipe (20), the car exhaust pipe (24) and the wire net (21) are fully covered by the fireproof mud (23). The fireproof mud (23) contains fireproof fibers and can prevent corrosion of the helical pipe (20), the wire net (21), the iron container (22) and the car exhaust pipe (24). At last, the iron container (22) is completely sealed. When the car starts, the car exhaust pipe (24) generates high temperature. Since the helical pipe (20) is installed outside of the car exhaust pipe (24), it is heated to a certain high temperature. The temperature will be maintained by the fireproof mud (23). The helical pipe (20) is maintained at a certain high temperature. When users push a switch (16), the pump (13) will pump out water in the water storage (11). When the water goes by the helical pipe (20) generating high temperature, it becomes hot, then hot water is provided to users from the water tap (15).

What is claimed is:

1. A heating device of a drinking fountain in a car, comprising:
   a car exhaust pipe, for exhausting gas from the car, and generating a high temperature;
   a helical pipe, made of a pipe coiled helically around an outside of a portion of the car exhaust pipe, and having one end as a water intake and the other end as a water outlet, the water outlet and the water inlet extend across an automobile chassis to connect with a water tap and a pump of the drinking fountain in the car, respectively;
   a wire net, covering the helical pipe and the portion of the car exhaust pipe, for preventing fireproof mud from loosening;
   an iron container, completely covering the helical pipe, the portion of the car exhaust pipe and the wire net and reserving a space; and
   fireproof mud containing fireproof fibers, poured into the space reserved in the iron container, for fully surrounding and fully covering the helical pipe, the wire net and the portion of the car exhaust pipe
   wherein the high temperature generated by the car exhaust pipe is conducted to the helical pipe when the car starts, the helical pipe being maintained at a high temperature by using the fireproof mud, corrosion of the helical pipe, the wire net, the iron container and the car exhaust pipe being prevented, and when the water in the drinking fountain goes by the helical pipe, it is heated for use, with the water for use being heated only by the car exhaust pipe.

* * * * *